United States Patent Office 3,549,230
Patented Dec. 22, 1970

3,549,230
ZOOMING DEVICE FOR ADJUSTING THE LIGHT AMOUNT OF A FORMED IMAGE
Jinichi Kato, Tokyo, and Takashi Tamori, Kawasaki-shi, Japan, assignors to Nippon Kogaku K.K., Tokyo, Japan, a corporation of Japan
Filed Feb. 27, 1968, Ser. No. 708,546
Claims priority, application Japan, Mar. 15, 1967, 42/21,656, 42/21,657
Int. Cl. G02b 21/06, 7/04, 15/00
U.S. Cl. 350—14                 2 Claims

ABSTRACT OF THE DISCLOSURE

A zooming lens system for a microscope is provided in which the brightness of the image formed remains constant during zooming operations and without substantially altering the aperture of the microscope objective. In one embodiment, two polarizing filters are provided, one of the filters being rotatable relative to the other about the optical axis of the system upon rotation of the zooming ring. In another embodiment, two wedge-shaped density plates are provided, at least one of the plates being movable relative to the other transversely of the optical axis upon rotation of the zooming ring.

---

This invention relates to the zooming device for adjusting the light amount of a formed image wherein the brightness of the formed image is changed along with the zooming operation, which comprises adjusting the light amount of a formed image to be equal to the light amount of a formed image at the case of the maximum magnification.

In recent years, movie photographing by using a microscope has become popular along with quick progress in the respective fields of science inclusive of medical field. Among the optical systems, those having the zooming optical system according to which continuous magnification can be done, are adapted for freely carrying out close-up or trimming of the object while photographing is being carried out, and therefore, in the research of microbes or bacteria, they play remarkably important effects. However, the numerical aperture or the incident light rays of zooming system of this kind can be determined by the objective lens to be connected thereto, and therefore, when magnification is changed, the brightness of the formed image (the illumination of the image surface) is accordingly changed, in other words, when it is adjusted to be high magnification, it becomes dark, and when it is adjusted to be low magnification, the brightness of the formed image becomes relatively bright. Therefore when magnification is changed during photographing, the change of light amount is brought about, and the irregularity of exposure is resulted at every frame of the film.

The object of the present invention is to provide the zooming device for adjusting the light amount of a formed image to remove the above mentioned drawbacks, and in accordance with this invention, in the case where a zooming optical system is arranged to the rear portion of the objective lens of a microscope or the like to carry out movie photographing, and the brightness of the formed image is changed by zooming operation, it is possible to adjust the same to be at a constant brightness or illumination. Therefore, the irregular exposure of the image caused by zooming operation can be perfectly prevented.

Since this invention is a system according to which the adjustment of the light amount of the formed image is carried out by a polarizing plate or wedge-shaped density plate and therefore there is no fear that the change of the color temperature should be brought about, and there is no trouble at all in the color photography. In addition, the wedge-shaped density plate is inserted into the parallel light path, and therefore if the adjustment of the light amount should be carried out, the change of the length of the optical path is not brought about, and in accordance with this invention, the adjustment of the light amount and zooming operation are interlocked, and therefore the operation thereof is simplified, and is assuredly carried out, and therefore this invention has remarkably practical convenience.

In accordance with this invention, in the zooming lens system wherein the brightness of the formed image is changed along with the zooming operation, two polarizing plates faced to the optical axis are provided in the optical path containing said zooming lens, either or both of the polarizing plates can be rotated in synchronous operation with the zooming operation of said zooming lens, and the light amount of a formed image is adjusted to be equal to the light amount of the formed image at the case of the maximum magnification by the grade of polarization caused by the rotation of the polarizing plate, or two wedge-shaped density plates are provided by facing the same to the optical axis in the parallel light path containing said zooming lens, and either or both of said wedge-shaped density plates can be displaced in the wedging direction by interlocking said wedge-shaped density plates to the zooming operation so that the wedge-shaped density plates can be displaced in the direction of the wedge to the effect that the light amount of the formed image can be always kept equal to the light amount of the formed image at the case of the maximum magnification by the changes of the density caused by the displacement operation thereof.

This invention will be described more clearly referring to the illustrative embodiments shown in the attached drawing, in which.

Figure 1:
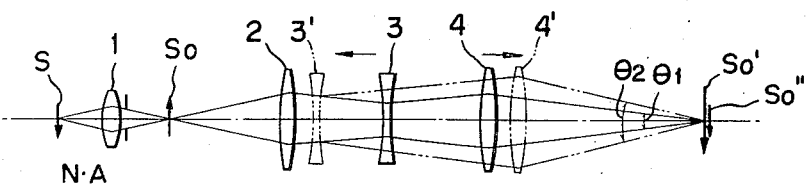
FIG. 1 is the conventional photographing optical system wherein a zooming lens is arranged to the rear portion of the objective lens.
Figure 2:
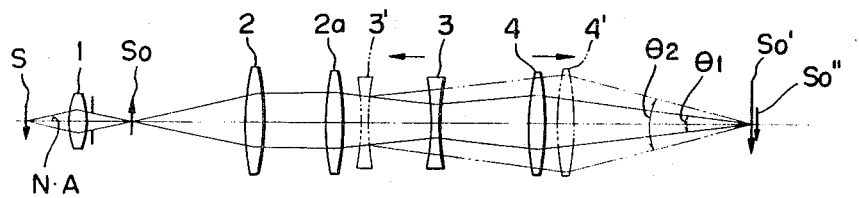
FIG. 2 is the conventional photographing optical system wherein a zooming lens having a relay lens is arranged to the rear portion of the object lens.

Referring first to FIG. 1 and FIG. 2, detailed explanations are made in accordance with FIG. 1 about the conventional photographing optical system wherein the zooming lens is arranged at the rear of the objective lens, and about the conventional optical system wherein the zooming lens having the relay lens at the rear of the object lens in accordance with FIG. 2; 1 is the objective lens of a microscope or the like; 2 is a field lens in FIG. 1, and 2 in FIG. 2 is a field lens whose focus is coincided with the image forming surface $S_o$ of the objective lens, and forms the parallel light path along with the relay lens $2a$; 3 and 4 are concave and convex zooming lenses, and they are so provided that said zooming lenses can be moved on the optical axis at a predetermined ratio simultaneously and respectively in the directions shown by arrows, and when 3 and 4 are displaced to the position 3′ and 4′, it is at the minimum magnification; S is the surface of the object to be examined, and $S_o$ is the primary image forming surface of the surface S of the object to be examined obtained by the objective lens 1; So' and So'' are, in FIG. 1, the secondary image forming surface of S obtained by the zooming lenses 2, 3 and 4, and in FIG. 2 So' and So'' are the secondary image forming surface of S obtained by the zooming lenses 2, 2a, 3 and 4, and they are represented respectively the image forming surface of high magnification and low magnification, and they are on the same plane surface.

When the surface S of the object is formed as the primary image of So at numerical aperture (N.A.) and a predetermined magnification by the objective lens 1 at the position of So, and when it enters in the zooming lenses 2 to 4 at the same numerical aperture (N.A.) or at the same angle, the zooming lenses 3, 4 are not moved, but remains on the initial positions shown by the full lines, the light rays form the secondary enlarged image on the surface So' at the angle of of $\theta_1$. Next, when the zooming lenses 3, 4 are moved by a predetermined amount as is shown by one dotted chain line in the direction shown by an arrow, the reduced secondary image is formed on the surface So'' at the angle of $\theta_2$. Therefore, the secondary image of the object S to be examined is formed on the same image forming surface So' and So'' in the enlarged form or reduced form, but the brightness of the two surface per unit area (or illuminations of the two surfaces) are apparently different. In other words, the brightness of the formed image is changed by the zooming magnification. Therefore, in movie photography, it is necessary to make constant the brightness of the formed image.

Figure 3:
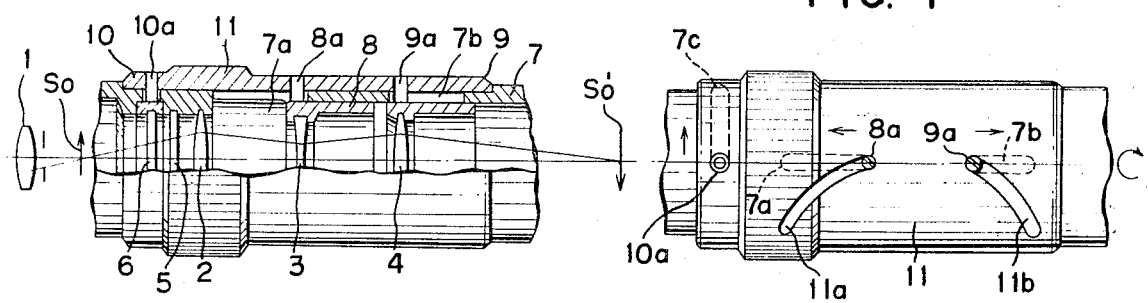
FIG. 3 is a partial cross sectional side view of an embodiment of the zooming device for adjusting the light amount of a formed image wherein the polarizing plate of this invention is provided on the optical system shown in FIG. 1.
Figure 4:
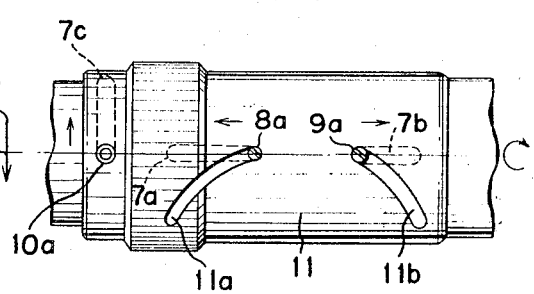
FIG. 4 is the plan view of the upper side of FIG. 3.

Referring next to FIG. 3 and FIG. 4, the detailed explanation about an embodiment of the zooming device for adjusting the light amount of the formed image having the polarizing plate of this invention in the optical system shown in FIG. 1, will be described; 5 and 6 are the polarizing plates, and they are provided in the optical path of the optical system in order to adjust the light amount of the formed image (the illumination of the image surface); 5 is provided on a lens barrel 7, which has the objective lens 1, and on the cylindrical portion thereof, the straight line guide grooves 7a, 7b and 7c are formed on the predetermined positions; 8 and 9 are movable lens barrels, and have the zooming lenses 3 and 4, respectively. On the external cylindrical portion of the barrel the pins 8a and 9a are respectively provided, and are fitted respectively into the guide grooves 7a and 7b, to effect that the rotation is stopped thereby and the barrel can be moved straightly; 10 is a rotatable frame provided with said polarizing plate 6, and is provided rotatably on the lens barrel 1; 10a is a pin provided on the rotatable frame 10, and transmits the rotation of the zooming ring 11 described hereinafter to the rotatable frame 10, and rotates the polarizing plate to adjust the light amount of the formed image; 11 is a zooming ring, and is rotatably provided on said lens barrel 7. The cam grooves 11a and 11b are formed on the cylindrical portion of the zooming ring so that the pins 8a and 9a can be fitted thereto and by rotation of the zooming ring, the zooming lenses 3 and 4 are simultaneously moved by predetermined amount in the direction shown by arrows to perform the various magnification. The cam grooves 11a and 11b move the zooming lenses 3 and 4, and at the same time, the form of the cam grooves 11a and 11b is shaped so that the increase and the decrease of the light amount of formed image or the illumination of image surface caused by zooming can be always equal to the adjusted light amount by the polarizing plates, and the light amount of the formed image can be always constant.

The structure of the device of this invention has been explained so far, and therefore in case of such a zooming lens that the brightness of the image surface or illumination of the image surface is bright (or high) at the minimum magnification, and it is dark (or low) at the maximum magnification, the relation between the cam grooves 11a and 11b and the rotation of the polarizing plate 6, is determined so that the brightness or the illumination of the image surface becomes the brightness or the illumination of the maximum magnification, and when the zooming ring 11 is rotated, the zooming lenses 3, 4 are moved respectively through the pins 8a and 9a by a predetermined amount in the predetermined directions to the effect that the continuous zooming can be performed, and at the same time, the rotation of the zooming ring 11 is transmitted to the metal frame 10 through the pin 10a and the polarizing plate 6 is rotated by a predetermined amount to perform the adjustment (correction) of the light amount, so that the brightness or illumination of the image surface can be constant always.

Figure 5:
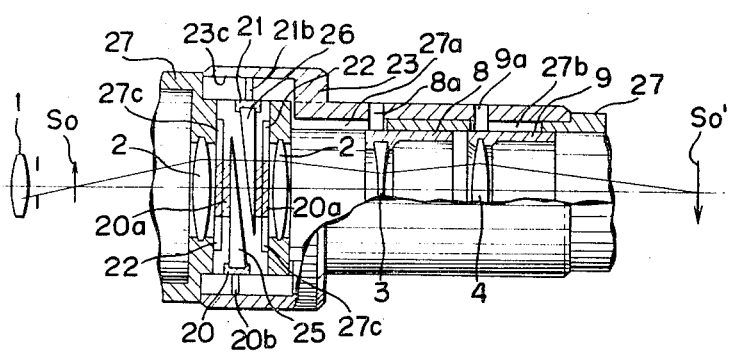
FIG. 5 is the partial cross sectional side view of an embodiment of the zooming device for adjusting the light amount of a formed image wherein the wedge-shaped density plate of this invention is provided within the parallel light path of the optical system shown in FIG. 2.
Figure 7:
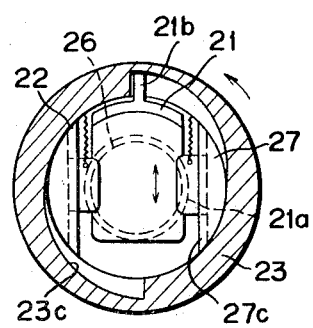
FIG. 7 is VII—VII line cross sectional view of FIG. 5.
Figure 6:
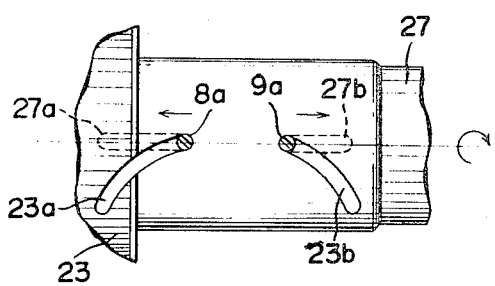
FIG. 6 is the plan of the upper side of FIG. 5.

Referring next to FIG. 5, FIG. 6, and FIG. 7, the detailed explanation will be made about another embodiment of the zooming device for adjusting the light amount of the formed image having the weld-shaped density plate of this invention provided in the parallel light path of the optical system shown in FIG. 2; 25 and 26 are the wedge-shaped density plates, and are provided in the parallel light path of the optical system in order to adjust the light amount of the formed image (the illumination of the image surface), and are displaced in the direction of the wedge by the device described hereinafter, and can change continuously the density; 27 is a lens barrel, and has the objective lens 1, the field lens 2, and the relay lens 2a, and on cylindrical portion thereof the straight line guide grooves 27a, and 27b are formed at the respective predetermined positions, and on the wall portion having the field lens 2 and the relay lens 2a, the dovetail groove 27c is formed; 8 and 9 are movable lens barrels, and has zooming lenses 3, 4. On the outer cylindrical portion thereof, the pins 8a and 9a are respectively provided, and are respectively fitted to the straight line guide grooves 27a and 27b to stop the rotation, and to move the movable lens barrels 8 and 9 straightly; 20 and 21 are the sliding frames, and have the wedge-shaped density plates 25, 26 and on the respective frames, the dovetail 20a and 21a are formed, and are fitted to the dovetail groove 27c of the lens barrel 27, to the effect that the frames can be displaced in the rectangular direction to the optical axis; 20b and 21b are the pins provided respectively on said sliding frames 20 and 21, and are provided so that the pins can be always fitted to the surface cam 23c of the zooming ring 23, which is rotatably fitted to the lens barrel 27. On the cylindrical portion of the zooming ring, the cam grooves 23a and 23b to which said pins 8a and 9a are fitted, are formed, and by the rotation of the zooming ring, the zooming lenses 3 and 4 are simultaneously moved by a predetermined amount in the direction shown by an arrow in FIG. 6 to perform the zooming effect. On the internal portion of the internal cylinder of zooming ring 23, the surface cam 23c for operating the wedge-shaped density plate, is formed, and said surface cam 23c is formed in such a manner that the increase or the decrease of the light amount of the formed image caused by the zooming effect is always equal to the light amount adjusted by the wedge-shaped density plate, and the light amount of the formed image or illumination of the image surface can be kept constant.

The structure of the device of this invention is as explained above and in the case of such a zooming lens that the brightness or the illumination of the image surface is bright (high) at the minimum magnification, and it is dark (or low) at the maximum magnification, the relation between the cam grooves 23a and 23b, and the amount of the movement of the wedge-shaped density plate is determined in such a manner that the brightness or the illumination of the image surface can become the brightness or the illumination of the image surface at the case of the maximum magnification, and when the zooming ring 23 is rotated, the zooming lenses 3 and 4 are moved by a predetermined amount in a predetermined direction respectively through the pins 8a and 9a to the effect that the continuous zooming can be carried out, and at the same time, by the effect of the surface cam 23c accompanied by the rotation of the zooming ring 23, the wedge-shaped density plates 25 and 26 can be moved by a predetermined amount through the pins 20b and 21b to the effect that the light amount can be adjusted (corrected), and the brightness of the image surface can be always kept constant.

We claim:

1. A zoom lens system for a microscope comprising in combination, a microscope objective, a zoom optical system of the relay type including movable lenses carried respectively by slidable lens barrels with each lens barrel having a pin projecting therefrom and a fixed lens for the parallel light path, the aperture of said objective acting as the entrance pupil of said zoom optical system during zoom operation thereof, a fixed barrel holding therein the zoom optical system and provided with slots through which each pin on the slidable lens barrel extends, a pair of wedge-shaped density plates in the parallel light path of the zoom optical system, a pair of sliding frames carrying said density plates, a pin on each of said frames, an operating ring rotatably supported on said fixed barrel, camming slots formed on said operating ring through which said pins of the lens barrel extend for axially sliding the slidable lens barrels, and two camming surfaces symmetrically formed at opposite portions of the inner face of said operating ring, each of said surfaces contacting one of said pins on said frames for moving said pair of sliding frames transversely to the optical axis of the zoom optical system and relative to each other upon movement of said operating ring, whereby the light of the image formed by said zoom optical system is made substantially constant by the relative movement of said pair of wedge plates caused by the rotation of said operating ring during zoom operation.

2. A zoom lens system for a microscope comprising in combination, a microscope objective, a zoom optical system of the relay type including movable lenses carried respectively by slidable lens barrels with each barrel having a pin projecting therefrom, the aperture of said objective acting as the entrance pupil of said zoom optical system during zoom operation thereof, a fixed barrel holding therein said zoom optical system and provided with slots through which each pin of the slidable lens barrel extends, a pair of polarizing plates on the optical axis of said zoom optical system, a ring frame for one of the polarizing plates and rotatably mounted about the optical axis of the zooming lens system, a pin on said frame, a circumferential groove in said fixed barrel through which the frame pin passes, and an operating ring rotatably supported on said fixed barrel and to which the extending end of the frame pin is secured, and camming slots formed on said operating ring through which said pins of the lens barrel extend for axially sliding the slidable barrels upon movement of said operating rings, whereby the light amount of the image formed by said zoom optical system is made substantially constant by the relative rotation of said rotatable polarizing plate upon rotation of said operating ring during zoom operation.

References Cited

UNITED STATES PATENTS

| | | | |
|---|---|---|---|
| 2,924,142 | 2/1960 | Nomarski | 350—12 |
| 3,151,205 | 9/1964 | Sparer | 350—17 |
| 3,405,989 | 10/1968 | Mentink | 350—10 |

FOREIGN PATENTS

| | | | |
|---|---|---|---|
| 622,389 | 11/1935 | Germany | 350—205 |
| 38/9,230 | 6/1963 | Japan | 350—159 |

PAUL R. GILLIAN, Primary Examiner

U.S. Cl. X.R.

350—44, 187